US012272338B2

(12) United States Patent
Gardner

(10) Patent No.: US 12,272,338 B2
(45) Date of Patent: Apr. 8, 2025

(54) PLECTRUM WITH MULTIPLE STRIKING EDGE INLAYS

(71) Applicant: Mark S. Gardner, Yardley, PA (US)

(72) Inventor: Mark S. Gardner, Yardley, PA (US)

( * ) Notice: Subject to any disclaimer, the term of this patent is extended or adjusted under 35 U.S.C. 154(b) by 208 days.

(21) Appl. No.: 18/309,204

(22) Filed: Apr. 28, 2023

(65) Prior Publication Data

US 2023/0260486 A1 Aug. 17, 2023

Related U.S. Application Data

(63) Continuation-in-part of application No. 17/666,056, filed on Feb. 7, 2022, now Pat. No. 11,676,561.

(51) Int. Cl.
*G10D 3/173* (2020.01)

(52) U.S. Cl.
CPC .................................... *G10D 3/173* (2020.02)

(58) Field of Classification Search
CPC ..................................................... G10D 3/173
See application file for complete search history.

(56) References Cited

U.S. PATENT DOCUMENTS

| | | | | |
|---|---|---|---|---|
| 633,877 | A | 9/1899 | Menzenhauer | |
| 2,961,912 | A | 11/1960 | Meola | |
| 3,181,410 | A | 5/1965 | Phillips | |
| 3,312,137 | A | 4/1967 | Oddo | |
| 4,790,227 | A | 12/1988 | Lukehart | |
| 5,894,097 | A | 4/1999 | Barry | |
| 6,008,442 | A | 12/1999 | Reidenbach | |
| 6,130,374 | A | 10/2000 | Polidori | |
| 6,133,516 | A | 10/2000 | Hendrickson | |
| 7,238,869 | B1 | 7/2007 | Kleckzka | |
| 8,395,038 | B2 | 3/2013 | Smith | |
| 9,153,213 | B2 | 10/2015 | Storey | |
| 9,190,034 | B2 | 11/2015 | Fortmuller | |
| 9,865,236 | B1 * | 1/2018 | Bradley | G10D 3/173 |
| 9,959,847 | B2 | 5/2018 | Hierholzer | |
| 10,043,496 | B2 | 8/2018 | Bradley et al. | |
| 10,304,424 | B1 | 5/2019 | Baker | |
| 10,418,004 | B1 | 9/2019 | Tomasi et al. | |
| 10,600,392 | B2 | 3/2020 | Holcomb | |

(Continued)

OTHER PUBLICATIONS

Heavy Repping Shop, "Sgian Fiodh agus Meatailt in Rosewood and Copper," obtained online on Mar. 14, 2022. <https://heavyrepping.com/shop/product/sgian-fiodh-agus-meatailt-in-rosewood-and-copper/>.

(Continued)

*Primary Examiner* — Robert W Horn
(74) *Attorney, Agent, or Firm* — Fox Rothschild LLP

(57) ABSTRACT

A plectrum for use with a stringed musical instrument is provided. The plectrum may comprise a rigid outer shell and a plurality of inlay portions. Each inlay portion, of the plurality of inlay portions, may be partially inserted within, and secured to, the outer shell, and may comprise a portion that extends beyond the outer shell. The outer shell may comprise a first material configured to produce first tonal properties in a string of a stringed musical instrument when placed in contact with the string. The plurality of inlay portions may comprise a second material configured to produce second tonal properties in the string when placed in contact with the string. The first tonal properties may be different from the second tonal properties.

20 Claims, 7 Drawing Sheets

(56) References Cited

U.S. PATENT DOCUMENTS

| | | | | |
|---|---|---|---|---|
| 10,937,397 | B2 | 3/2021 | Hierholzer | |
| 11,676,561 | B1 * | 6/2023 | Gardner ................. | G10D 3/173 84/322 |
| 11,699,418 | B1 * | 7/2023 | Derr ....................... | G10D 3/173 84/322 |
| 2008/0163737 | A1 | 7/2008 | Grant | |
| 2015/0154946 | A1 | 6/2015 | Fortmuller | |
| 2017/0287451 | A1 * | 10/2017 | Novak ................... | G10D 3/173 |
| 2021/0225337 | A1 | 7/2021 | Hierholzer | |
| 2023/0260486 | A1 * | 8/2023 | Gardner ................. | G10D 3/173 84/320 |

OTHER PUBLICATIONS

Dava, "Dava the most advanced and innovative guitar picks sold today," obtained online on Mar. 14, 2022. <https://www.davapick.com/>.

* cited by examiner

PLECTRUM WITH MULTIPLE STRIKING EDGE INLAYS

RELATED APPLICATION DATA

This application is a continuation-in-part application to, and claims priority to, U.S. patent application Ser. No. 17/666,056, filed Feb. 7, 2022, the disclosure of which is incorporated herein by reference in its entirety.

BACKGROUND

The present disclosure relates to plectrums and, in particular, to guitar plectrums comprising metal inlays for improving tonal quality, accuracy, and other performance features.

Stringed musical instruments typically include one or more strings, generally held taut, that produce sound when physically acted upon. Depending upon the stringed musical instrument, the strings are generally acted upon using the hands/fingers of the user, using a bow, or using a form of plectrum. A plectrum is a device that is used to strike, pluck, or rub the strings of a stringed musical instrument (e.g. a guitar, mandolin, banjo, or other similarly designed stringed musical instrument), in order to create a sound from the resonance or vibration of the strings over a resonating hollow cavity, or to be captured by an electronic transducer (commonly referred to as a “pickup”) designed to sense and capture vibrations from agitation of the strings by the action of striking, plucking, or rubbing the strings. A plectrum used with a guitar is commonly referred to as a “guitar pick.”

There is no single material from which a plectrum can be made. Rather, plectrums can be produced using a variety of natural and/or synthetic materials and in various shapes and/or sizes in order to satisfy the plectrum user’s preference for grip, flexibility, and accuracy in the process of bringing the string or strings of the stringed musical instrument under increased, temporary tension through the act of striking, plucking, or rubbing the strings in order to cause the strings to vibrate with an audible resonance in the creation of music or auditory effect.

The sound produced using a plectrum can be affected not only by the shape of the plectrum, but also by the material or materials used to form the plectrum. Due to the differences in sound production inherent with different materials, the preference in use of materials for a particular plectrum is subject to the audible sound that the plectrum creates.

Generally, a guitar plectrum is designed such that it includes a striking edge which is configured to come into contact with one or more of the strings on the guitar, creating resonance or vibration of the strings, producing sound. The material of the striking edge of the guitar plectrum affects the audible sound produced by the guitar. For example, guitar plectrums, depending upon the material of the striking edge, can cause the guitar to produce a clicking sound on the guitar or, as is heard in the use of a fully metallic guitar plectrum, a higher pitched “twang” when the guitar plectrum is released from the tension of the string as it is passed over the string in the action of striking, plucking, or rubbing the string.

The material or materials used to create guitar plectrums can alter the sound produced by the guitar in such meaningful ways that musicians and composers can account for the differences in the sounds in how they compose, record, and/or perform music with a stringed musical instrument. In order to decrease or eliminate the secondary sound caused by the guitar plectrum material or materials, some composers and/or musicians will choose a guitar plectrum that creates less secondary sound or play with no guitar plectrum, instead using the tips of their fingers or fingernails, while other musicians and/or composers may request and/or use particular guitar plectrums in order to incorporate the secondary sounds produced using the particular guitar plectrum in order to reproduce the secondary sounds in a controlled manner when composing, performing, and/or recording. Additionally, a recording engineer may also dictate the use, style, and material composition of guitar plectrum when creating recordings of a performance so as to control or suppress these secondary sounds.

For at least these reasons, in addition to the manufacture and material construction of the guitar and strings of the guitar, the manufacture and material construction of guitar plectrums is crucial in generating secondary audible characteristics during the playing of a guitar, and a guitar plectrum which enables greater control of the primary and secondary sound produced by the guitar when striking, plucking, and/or rubbing the strings of the guitar is needed.

SUMMARY

According to an object of the present disclosure, a plectrum for use with a stringed musical instrument is provided. The plectrum may comprise a rigid outer shell and a plurality of inlay portions. Each inlay portion, of the plurality of inlay portions, may be partially inserted within, and secured to, the outer shell, and may comprise a portion that extends beyond the outer shell. The outer shell may comprise a first material configured to produce first tonal properties in a string of a stringed musical instrument when placed in contact with the string. The plurality of inlay portions may comprise a second material configured to produce second tonal properties in the string when placed in contact with the string. The first tonal properties may be different from the second tonal properties.

According to various embodiments, the first material may be different from the second material.

According to various embodiments, the second material may comprise metal.

According to various embodiments, the first material may comprise one or more of the following: plastic; metal; wood; rubber; glass; and stone.

According to various embodiments, for each of one or more inlay portions of the plurality of inlay portions, the outer shell and the inlay portion may be shaped such that a surface of the outer shell is flush with a surface of the inlay portion at a transition between the outer shell and the inlay portion.

According to various embodiments, the one or more inlay portions of the plurality of inlay portions may comprise all the plurality of inlay portions.

According to various embodiments, the outer shell may comprise a front half portion and a rear half portion, and the front half portion and the rear half portion may be secured to each other.

According to various embodiments, one or more of the plurality of inlay portions may be secured within the outer shell using a chemical bonding agent.

According to various embodiments, each inlay portion of the plurality of inlay portions may taper toward a striking edge.

According to various embodiments, one or more of the plurality of inlay portions may comprise a plurality of holes configured to facilitate mechanical means of securing the inlay portion to the outer shell.

According to various embodiments, one or more inlay portions of the plurality of inlay portions may have a generally chevron-type shape.

According to various embodiments, the outer shell may comprise an opening configured to receive a portion of the inlay portion.

According to various embodiments, one or more inlay portions of the plurality of inlay portions may comprise a textured surface for facilitating bonding between the outer shell and the inlay portion.

According to various embodiments, the plurality of inlay portions may comprise an inlay portion comprising one or more inverted scallops.

According to an object of the present disclosure, a plectrum for use with a stringed musical instrument is provided. The plectrum may comprise a rigid outer shell and an inlay portion. The inlay portion may be partially inserted within, and secured to, the outer shell, may comprise a portion that extends beyond the outer shell, and may comprise one or more inverted scallops. The outer shell may comprise a first material configured to produce first tonal properties in a string of a stringed musical instrument when placed in contact with the string. The inlay portion may comprise a second material configured to produce second tonal properties in the string when placed in contact with the string. The first tonal properties may be different from the second tonal properties.

According to various embodiments, the outer shell and the inlay portion may be shaped such that a surface of the outer shell is flush with a surface of the inlay portion at a transition between the outer shell and the inlay portion.

According to various embodiments, the plectrum may further comprise one or more second inlay portions. One or more of the one or more second inlay portions may be partially inserted within, and secured to, the outer shell, and may comprise a portion that extends beyond the outer shell.

According to various embodiments, for each second inlay portion of the one or more second inlay portions, the outer shell and the second inlay portion may be shaped such that a surface of the outer shell is flush with a surface of the second inlay portion at a transition between the outer shell and the second inlay portion.

According to various embodiments, the outer shell may comprise an opening configured to receive a portion of the inlay portion.

According to various embodiments, the outer shell may comprise a front half portion and a rear half portion, and the front half portion and the rear half portion may be secured to each other.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to."

In this document, the term "approximately," when used in connection with a numeric value, is intended to include values that are close to, but not exactly, the number. For example, in some embodiments, the term "approximately" may include values that are within +/−10 percent of the value.

Figure 1:
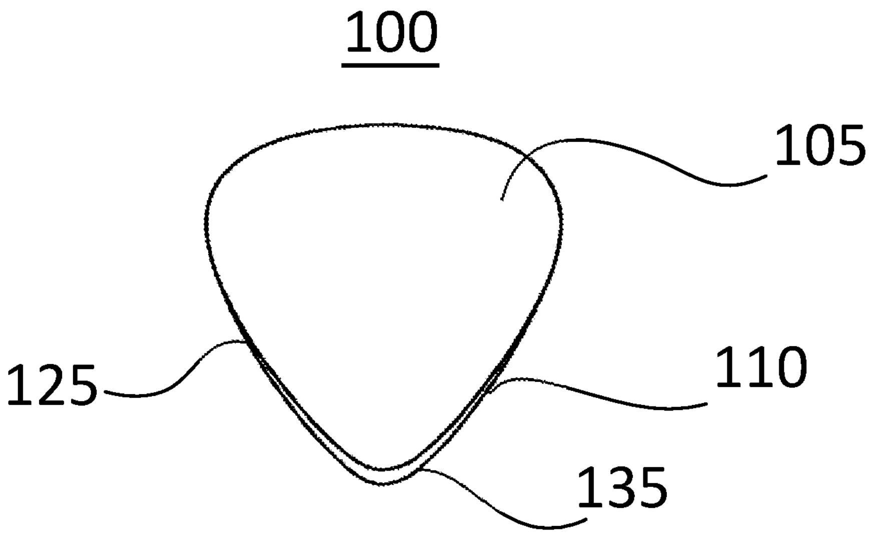
FIG. 1 is an example of a plectrum comprising a metal inlay within an outer shell for controlling primary and secondary sounds of a guitar, in accordance with various embodiments of the present disclosure.

Referring now to FIG. 1, a plectrum 100 comprising an inlay portion 110 within an outer shell 105 is illustratively depicted, in accordance with various embodiments of the present disclosure.

Figure 2A:
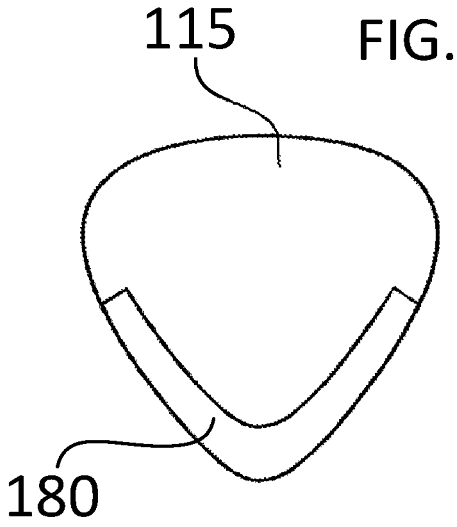
FIGS. 2A-2B is an example of a front half (FIG. 2A) and a rear half (FIG. 2B) of an outer shell of a plectrum, in accordance with various embodiments of the present disclosure.
Figure 2B:
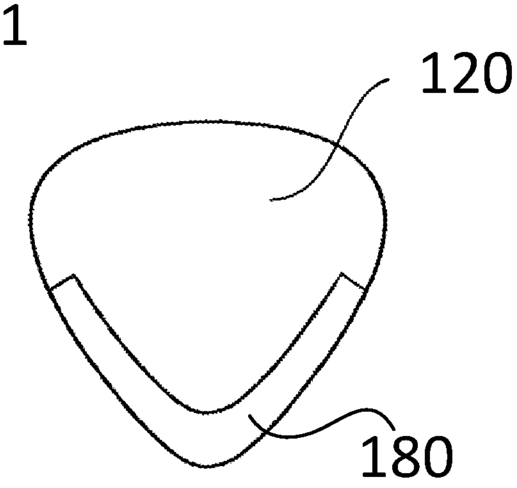

According to various embodiments, the plectrum 100 may comprise an outer shell 105 and an inlay portion 110 partially housed within the outer shell 105. According to various embodiments, the outer shell 105 may be composed of a single uniform piece. According to various embodiments, the outer shell 105 may be comprised of a plurality of individual pieces sealed together, encasing at least a portion of the inlay portion 110. For example, in the embodiment shown in FIGS. 2A-2B, the outer shell 105 may be comprised of a front half portion 115 and a rear half portion 120. According to various embodiments, the front half portion 115 and/or the rear half portion 120 may comprise a depression 180 into which the inlay portion 110 may be configured to be positioned. According to various embodiments, the various pieces of the outer shell 105 may be secured together via suitable securing means such as, e.g., adhesion (e.g., chemical adhesion), mechanical means (e.g., screws, nails, rivets, etc.) and/or other suitable securing means.

According to various embodiments, the outer shell 105 may comprise have a variety of shapes, widths, depths, and/or thicknesses. For example, the outer shell 105 may have rounded corners, pointed corners, a generally triangular profile, a generally oblong profile, a generally rounded profile, and/or other suitable shapes and/or profiles which can be used to enable the plectrum 100 to be used with a stringed instrument such as, e.g., a guitar. According to various embodiments, the outer shell 105 may comprise one or more scallops and/or one or more inverted scallops 1005, as shown, e.g., in the plectrum 100 illustrated in FIGS. 10-12B. According to various embodiments, the inlay portion 110 may be configured to compliment and/or follow the shape of an outer portion of the outer shell 105 from which extends. For example, when a portion of the outer shell 105 comprises one or more scallops and/or one or more inverted scallops 1005, an inlay portion 110 along that portion of the outer shell 105 may comprise one or more complimenting scallops and/or one or more complimenting inverted scallops 1005. According to various embodiments, the shape and dimensions of the outer shell 105 may be configured to enhance and/or compliment the grip, playstyle, and/or desired tonal qualities of the user.

The outer shell 105 may comprise one or more materials such as, e.g., plastic, metal, wood, rubber, glass, stone, and/or other suitable materials. According to various embodiments, the outer shell 105 may be formed using suitable forming processes for the material and/or materials used in the manufacturing of the outer shell 105. For example, the processes for forming the outer shell 105 may comprise methods such as carving, sanding, machining, injection molding, and/or other suitable means for shaping the outer shell 105.

The inlay portion 110 may be configured to be positioned at least partially within the outer shell 105. According to various embodiments, the inlay portion 110 may be a component of the plectrum 100 that is separate and apart from the outer shell 105. The inlay portion 110 may comprise one or more metal and/or metal alloy materials (e.g., copper, iron, steel, silver, aluminum, brass, nickel, and/or other suitable metal and/or metal alloy materials). According to various embodiments, the inlay portion 110 may have a generally "V" or chevron shape and may be generally uniform in width and thickness. According to various embodiments, the outer shell 105 may comprise an opening configured to act as a receiving area for receiving the inlay portion 110, and the receiving area may be shaped to snugly receive a portion of the inlay portion 110.

According to various embodiments, the plectrum 100 may comprise a securing means for securing the outer shell 105 to the inlay portion 110. The securing means may comprise, but is not limited to, chemical adhesion, heat-assisted adhesion, pressure-activated adhesion, pressure-fitting, material pass-through (e.g., during injection molding), riveting, insertion of one or more posts 130, such as shown in FIG. 4B), and/or other suitable securing means.

Figure 6:
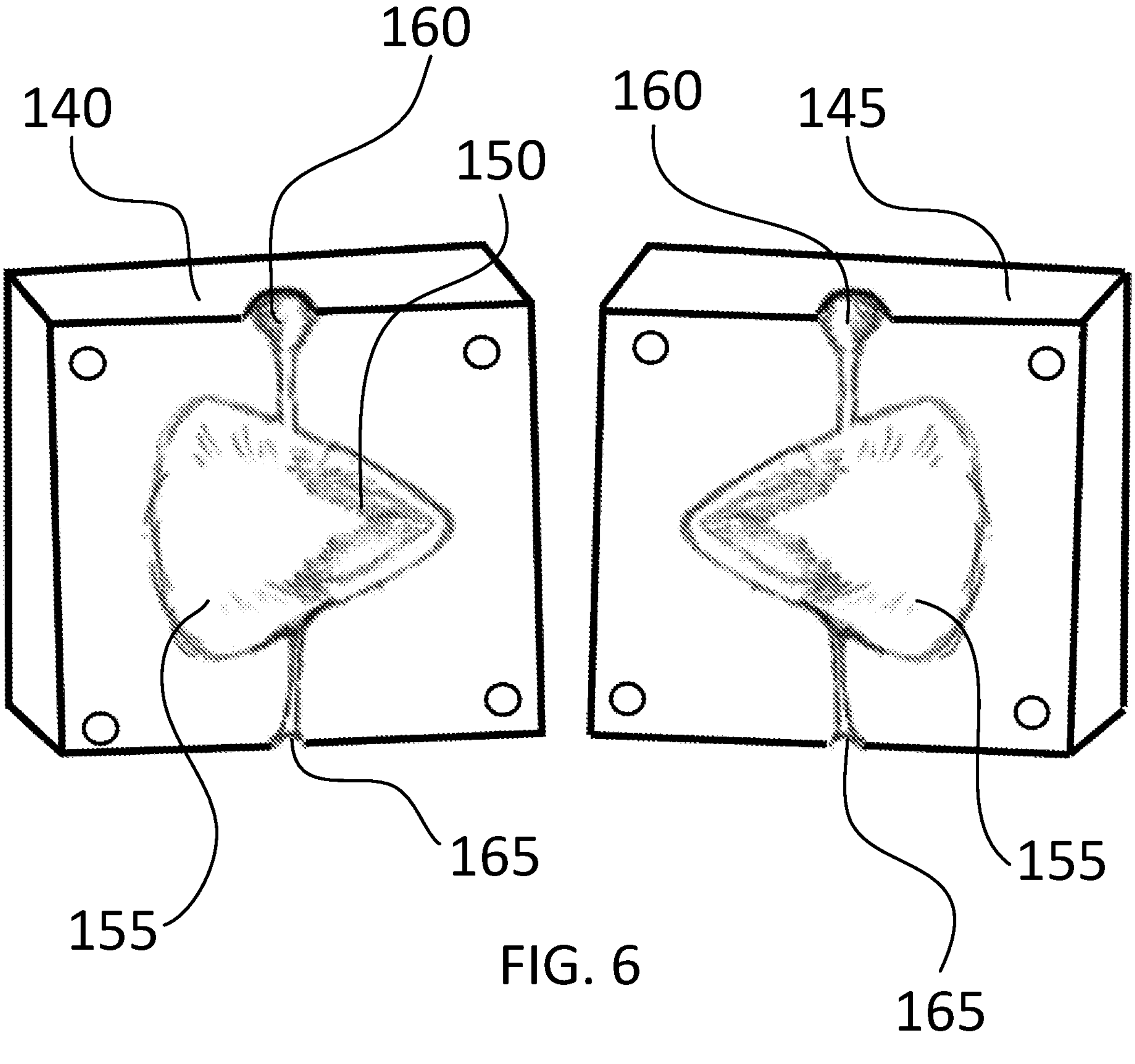
FIG. 6 is an example of a plectrum injection molding form, in accordance with various embodiments of the present disclosure.

According to various embodiments, the outer shell 105 may be formed within a mold (e.g., through injection molding and/or other suitable molding means). According to various embodiments, the plectrum 100 may be formed through injection molding. As shown in FIG. 6, a first half 140 and a second half 145 of an injection mold block is shown. During the injection molding process, the inlay portion 110 may be placed within the injection mold block within an inlay portion shelf 150 which may be configured to correctly position the inlay portion 110 within the injection mold block. The inlay portion shelf 150 may be configured to be positioned within a depression 155 within the two halves 140, 145 of the injection mold block. Once the inlay portion 110 is properly placed along the inlay portion shelf 150, the first half 140 and the second half 145 of the injection mold block may be positioned together such that the depressions 155 are aligned. The outer shell 105 material may then inserted into the injection mold block through the inflow valve 160. The outer shell 105 material may fill in the cavity formed by the depressions 155, forming the outer shell and encasing a portion of the inlay portion 110, securing it in place. According to various embodiments, the injection mold block may further comprise a relief port 165 for excess outer shell 105 material.

Figure 4A:
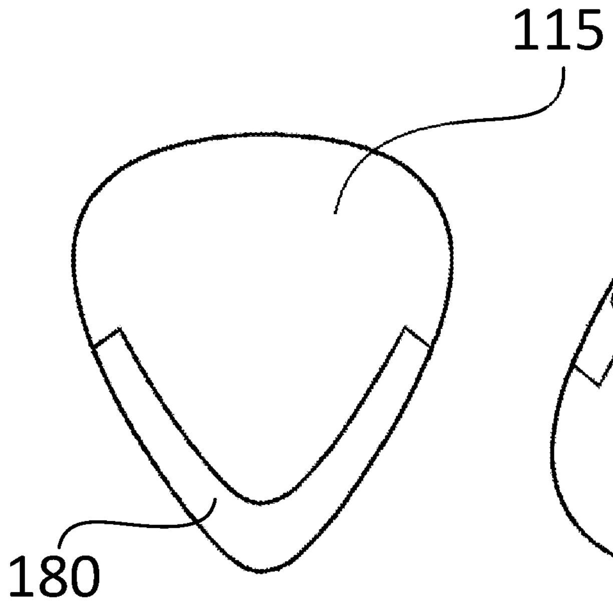
FIGS. 4A-4B is an example of a front half (FIG. 4A) and a rear half (FIG. 4B) of an outer shell of a plectrum, in accordance with various embodiments of the present disclosure.
Figure 4B:
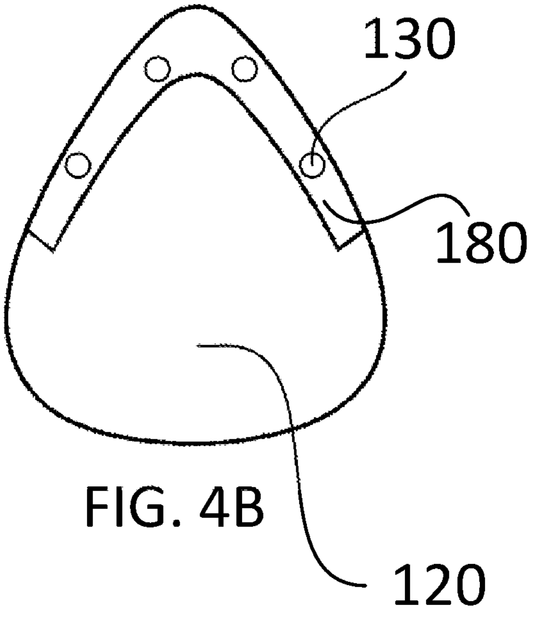
Figure 5:
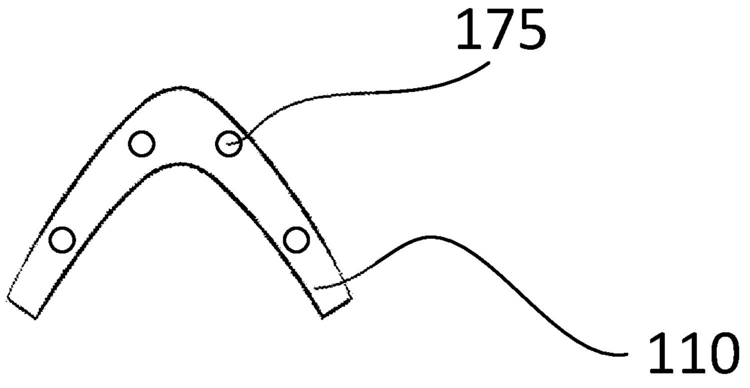
FIG. 5 is an example of a metal inlay of a plectrum, in accordance with various embodiments of the present disclosure.

According to various embodiments, the inlay portion 110 may comprise one or more holes 175 (e.g., drilled holes), such as shown, e.g., in FIGS. 4A-4B, which act as channels for securing the metal insert into a molded or extruded plectrum during the extrusion or molding of a synthetic or plastic plectrum.

Figure 3:
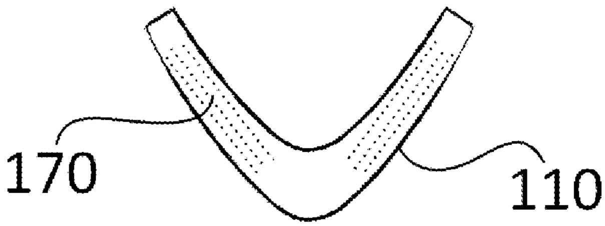
FIG. 3 is an example of a metal inlay of a plectrum, in accordance with various embodiments of the present disclosure.

According to various embodiments, the inlay portion 110 may comprise a textured surface 170 (such as shown, e.g., in FIG. 3) for aiding in securing the inlay portion 110 to the outer shell 105. For example, the inlay portion 110 may be scuffed or etched in order to create a more secure bond with a chemical bonding agent when inserted into the outer shell 105. According to various embodiments, other types of bonding agents, such as, for example, those bonded under physical pressure and/or thermal-active means, may be used.

According to various embodiments, a portion 125 of the inlay portion 110 may extend beyond the outer shell 105. The portion 125 of the inlay portion 110 which extends beyond the outer shell 105 may comprise an outer edge which may be configured to function as a striking edge 135 configured to act upon the instrument's string(s) in a manner that causes or induces vibrations in the string(s). According to various embodiments, the portion 125 of the inlay portion 110 which extends beyond the outer shell 105 may be beveled, pointed, rounded, tapered, and/or otherwise shaped in order to reduce the thickness of the portion 125 toward the striking edge 135 used to interact with a stringed instrument's strings (e.g., guitar strings and/or other suitable stringed instrument strings).

According to various embodiments, the material of the outer shell 105 may be different from the material of the inlay portion 110. Additionally, the material of the outer shell 105 may be configured produce a first tonal quality when placed in contact with the stringed instrument strings, the material of the inlay portion 110 may be configured to produce a second tonal quality when placed in contact with the stringed instrument strings, and the first tonal quality may be different from the second tonal quality. The first tonal qualities and the second tonal qualities each may be configured to contribute unique tonal characteristics of the plectrum 100 and its effect on the strings via the physical characteristics of its materials.

According to various embodiments, variations in the materials used in the manufacture of the outer shell 105 and/or the inlay portion 110, and variations in the manner of manufacturing, combining, securing, and/or adhering the materials of the outer shell 105 and/or the inlay portion 110 may have a direct effect on the first tonal qualities, the second tonal qualities, and the overall resonation quality of the sound created through the mechanical interaction between the plectrum 100 and the strings in the action of striking, picking, or rubbing the strings. For example, the specific metals that are used to create the striking edge 135 may have varied tonal and resonance attributes depending upon the material type or types used in the construction of the inlay portion 110.

In addition to the materials used for the outer shell 105 and the inlay portion 110, the means of how the inlay portion 110 is fixed (e.g., mechanically, chemically, etc.) within the outer shell may contribute to the manner of use, tone, and feel of the plectrum 100 as a whole. For example, whether the inlay portion 110 is molded into, secured by pins, adhered by chemical bonding agents, and/or secured by other suitable means within the outer shell 105 effects the tonal qualities of the plectrum 100. The outer shell 105 may have the effect of dampening the metallic sound or "twang" of the metal striking edge 135 of the inlay portion 110 to degrees based upon the means in which the inlay portion 110 is fixed within the outer shell 105. If the inlay portion 110 is fixed to the outer shell 105 using an adhesive means, the material used to adhere the inlay portion 110 to the outer shell 105 may be varied based upon user preferences of thickness, width, and weight for the overall plectrum 100.

According to various embodiments, the material(s), shape(s), and/or dimensions of the outer shell 105 and/or the material(s), shape(s), and/or dimensions of the inlay portion 110 may be altered in order to alter the first tonal quality and/or the second tonal quality, and/or to increase or decrease the strength of the physical assembly of the plectrum 100. Alterations may comprise, but are not limited to, increasing and/or decreasing thickness, drilling, abrading the striking edge 135, irregularly shaping the striking edge 135, and/or other suitable alterations.

According to various embodiments, the outer shell 105 may form a rigid body, and the surface of the plectrum 100 may be shaped such that the surface of the outer shell 105 is flush with the surface of the portion 125 of the inlay portion 110 that extends past the outer shell 105 at the transition between the outer shell 105 and the inlay portion 110, enabling a smooth transition for the stringed instrument strings when rubbing over the plectrum 100, enabling the plectrum 100 to produce, on the guitar, the first tonal quality and the second tonal quality.

It is noted that, while the plectrum 100 above was described in terms of being used in conjunction with a guitar, the plectrum 100, according to various embodiments, may be configured for use with other stringed musical instruments such as, e.g., a bass, mandolin, banjo, cello, violin, fiddle, and/or other suitable stringed musical instruments.

According to various embodiments, the plectrum 100 may comprise a plurality of inlay portions 110, as shown, e.g., in FIGS. 7-12B.

Figure 7:
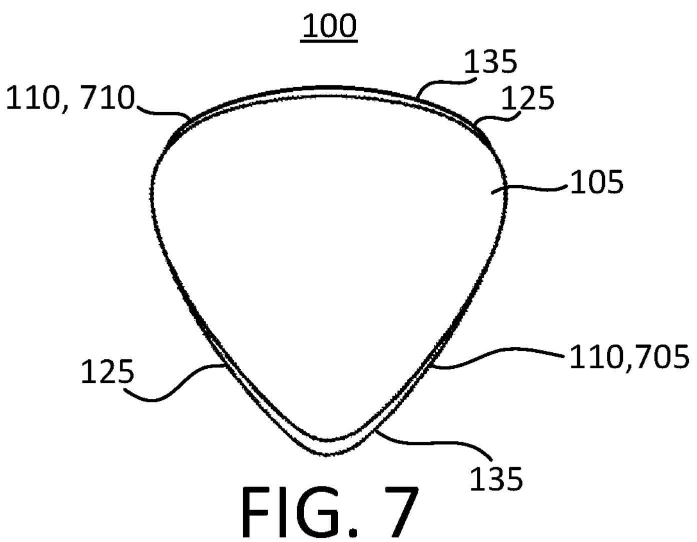
FIG. 7 is an example of a plectrum comprising a plurality of metal inlays within an outer shell for controlling primary and secondary sounds of a guitar, in accordance with various embodiments of the present disclosure.
Figures 8A, 8B:
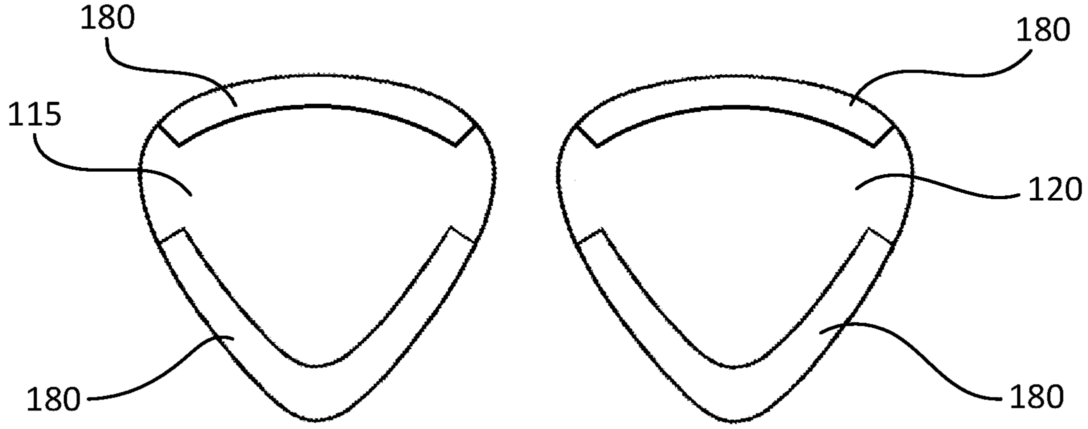
FIGS. 8A-8B is an example of a front half (FIG. 8A) and a rear half (FIG. 8B) of an outer shell of a plectrum, in accordance with various embodiments of the present disclosure.
Figure 9A:
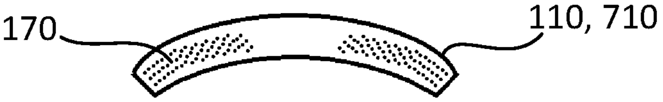
FIG. 9A is an example of a metal inlay of a plectrum, in accordance with various embodiments of the present disclosure.
Figure 9B:
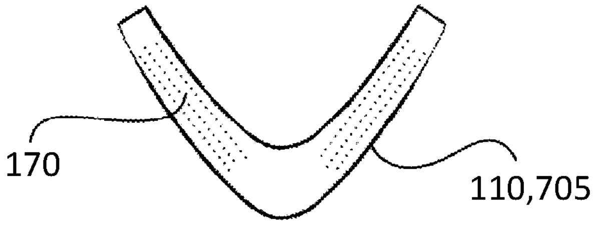
FIG. 9B is an example of a metal inlay of a plectrum, in accordance with various embodiments of the present disclosure.
Figure 10:
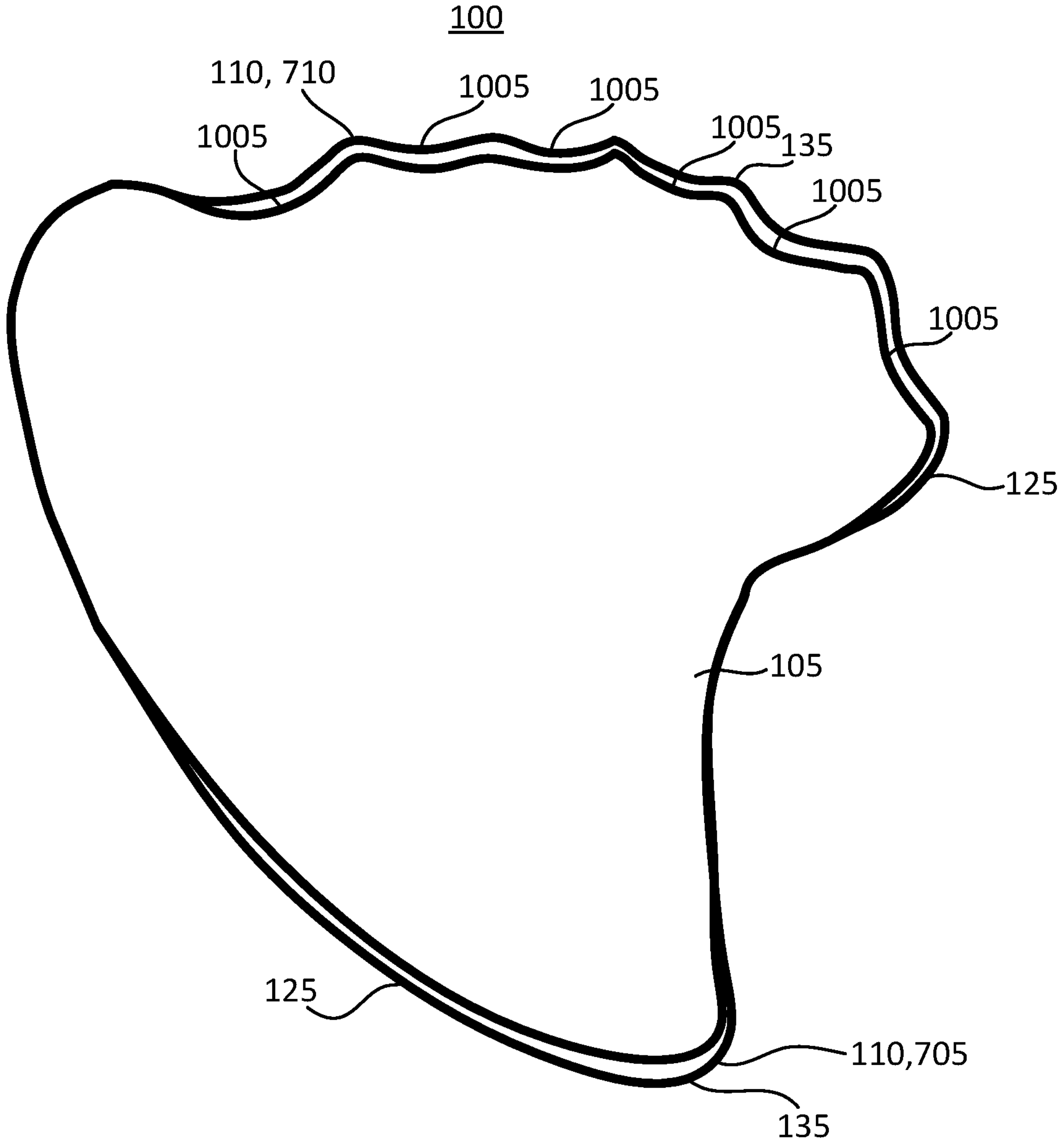
FIG. 10 is an example of a plectrum comprising a plurality of metal inlays within an outer shell for controlling primary and secondary sounds of a guitar, in accordance with various embodiments of the present disclosure.

Referring now to FIG. 7, a plectrum 100 comprising a plurality of inlay portions 110 within an outer shell 105 is illustratively depicted, in accordance with various embodiments of the present disclosure. While the plectrum 100 of FIG. 7 shows a first inlay portion 705 and a second inlay portion 710 (or, e.g., a plurality of second inlay portions 710), it is noted that the plectrum 100 may comprise more or fewer inlay portions 110, as needed.

According to various embodiments, the plurality of inlay portions 110 (705, 710) may be configured to be partially housed within the outer shell 105. According to various embodiments, the outer shell 105 may be composed of a single uniform piece. According to various embodiments, the outer shell 105 may be comprised of a plurality of individual pieces sealed together, encasing at least a portion of the plurality of inlay portions 110 (705, 710). For example, in the embodiment shown in FIGS. 8A-8B, the outer shell 105 may be comprised of a front half portion 115 and a rear half portion 120. According to various embodiments, the front half portion 115 and/or the rear half portion 120 may comprise one or more depressions 180 into which the plurality of inlay portions 110 (705, 710) may be configured to be positioned. According to various embodiments, the various pieces of the outer shell 105 may be secured together via suitable securing means such as, e.g., adhesion (e.g., chemical adhesion), mechanical means (e.g., screws, nails, rivets, etc.) and/or other suitable securing means.

According to various embodiments, the outer shell 105 may comprise have a variety of shapes, widths, depths, and/or thicknesses. For example, the outer shell 105 may have rounded corners, pointed corners, a generally triangular profile, a generally oblong profile, a generally rounded profile, and/or other suitable shapes and/or profiles which can be used to enable the plectrum 100 to be used with a stringed instrument such as, e.g., a guitar. According to various embodiments, the outer shell 105 may comprise one or more scallops and/or inverted scallops 1005, as shown, e.g., in the plectrum 100 illustrated in FIGS. 10-12B. According to various embodiments, one or more inlay portions 110, of the plurality of inlay portions 110, may be configured to compliment and/or follow the shape of an outer portion of the outer shell 105 from which it extends. For example, when a portion of the outer shell 105 comprises one or more scallops and/or one or more inverted scallops 1005, an inlay portion 110 along that portion of the outer shell 105 may comprise one or more complimenting scallops and/or one or more complimenting inverted scallops 1005. According to various embodiments, the plurality of inlay portions 110 may be of a same shape, a plurality of different shapes, and/or a combination of same and/or dissimilar shapes. According to various embodiments, the shape and dimensions of the outer shell 105 may be configured to enhance and/or compliment the grip, playstyle, and/or desired tonal qualities of the user.

The outer shell 105 may comprise one or more materials such as, e.g., plastic, metal, wood, rubber, glass, stone, and/or other suitable materials. According to various embodiments, the outer shell 105 may be formed using suitable forming processes for the material and/or materials used in the manufacturing of the outer shell 105. For example, the processes for forming the outer shell 105 may comprise methods such as carving, sanding, machining, injection molding, and/or other suitable means for shaping the outer shell 105.

One or more of the plurality of inlay portions 110 may be configured to be positioned at least partially within the outer shell 105. According to various embodiments, one or more of the plurality of inlay portions 110 may be a component of the plectrum 100 that is separate and apart from the outer shell 105. One or more of the plurality of inlay portions 110 may comprise one or more metal and/or metal alloy materials (e.g., copper, iron, steel, silver, aluminum, brass, nickel, and/or other suitable metal and/or metal alloy materials). According to various embodiments, one or more of the plurality of inlay portions 110 may be generally uniform in width and thickness. According to various embodiments, the outer shell 105 may comprise one or more openings configured to act as a receiving area for receiving the one or more inlay portions 110, and the receiving area may be shaped to snugly receive a portion of the one or more inlay portions 110.

Figure 11B:
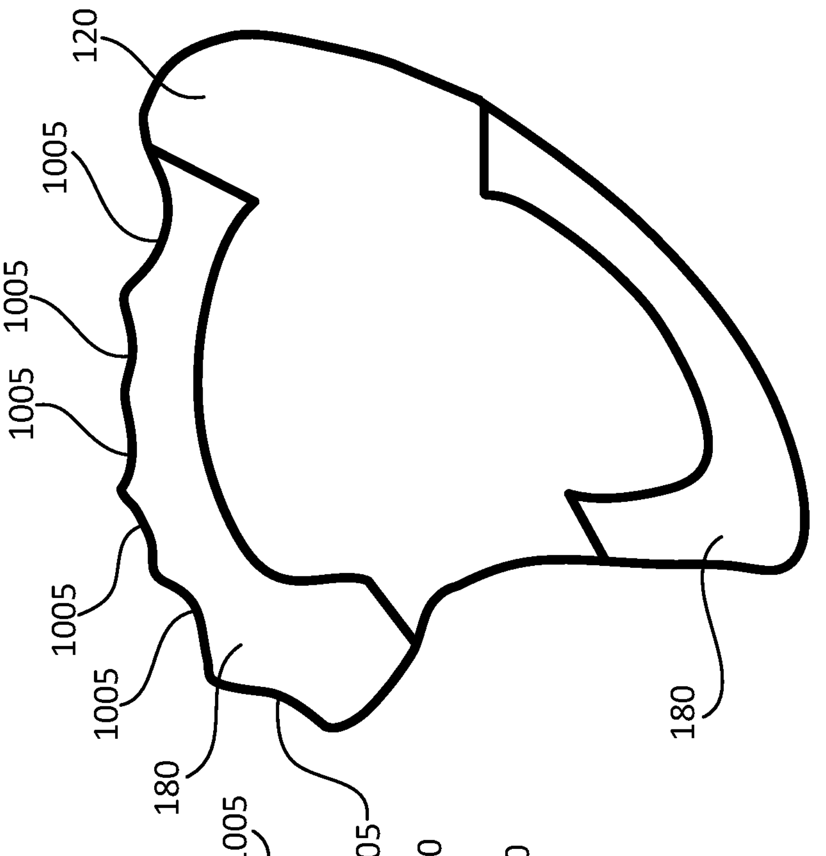
FIGS. 11A-11B is an example of a front half (FIG. 11A) and a rear half (FIG. 11B) of an outer shell of a plectrum, in accordance with various embodiments of the present disclosure.
Figure 11A:
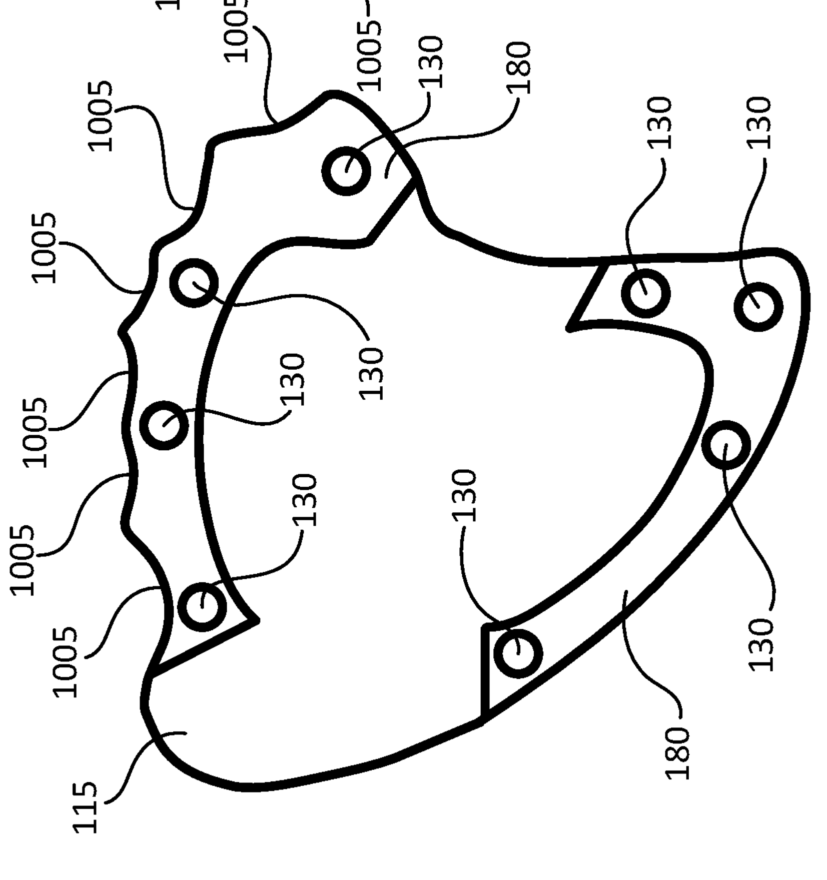

According to various embodiments, the plectrum 100 may comprise a securing means for securing the outer shell 105 to one or more of the plurality of inlay portions 110. The securing means may comprise, but is not limited to, chemical adhesion, heat-assisted adhesion, pressure-activated adhesion, pressure-fitting, material pass-through (e.g., during injection molding), riveting, insertion of one or more posts 130, such as shown in FIG. 11A), and/or other suitable securing means.

Figure 12A:
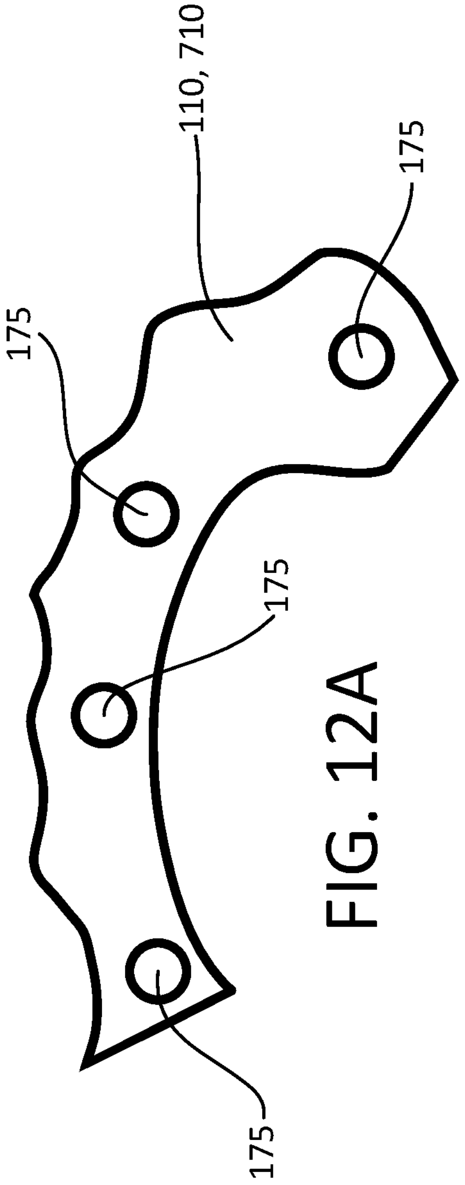
FIG. 12A is an example of a metal inlay of a plectrum, in accordance with various embodiments of the present disclosure.
Figure 12B:
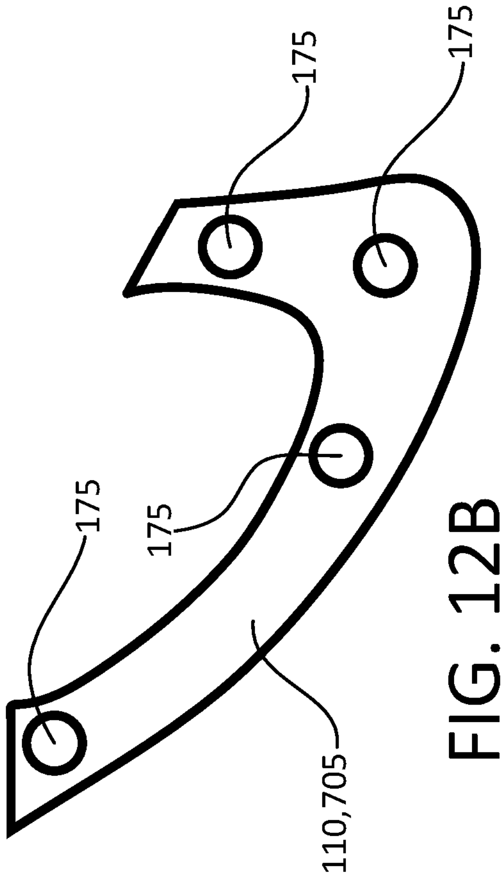
FIG. 12B is an example of a metal inlay of a plectrum, in accordance with various embodiments of the present disclosure.

According to various embodiments, one or more of the plurality of inlay portions 110 may comprise one or more holes 175 (e.g., drilled holes), such as shown, e.g., in FIGS. 12A-12B, which act as channels for securing the metal insert into a molded or extruded plectrum during the extrusion or molding of a synthetic or plastic plectrum.

According to various embodiments, one or more of the plurality of inlay portions 110 may comprise a textured surface 170 (such as shown, e.g., in FIGS. 9A-9B) for aiding in securing the inlay portion 110 to the outer shell 105. For example, one or more of the plurality of inlay portions 110 may be scuffed or etched in order to create a more secure bond with a chemical bonding agent when inserted into the outer shell 105. According to various embodiments, other types of bonding agents, such as, for example, those bonded under physical pressure and/or thermal-active means, may be used.

According to various embodiments, a portion 125 of one or more of the plurality of inlay portions 110 may extend beyond the outer shell 105. The portion 125 of the one or more of the plurality of inlay portions 110 which extends beyond the outer shell 105 may comprise an outer edge which may be configured to function as a striking edge 135 configured to act upon the instrument's string(s) in a manner that causes or induces vibrations in the string(s). According to various embodiments, the portion 125 of the one or more of the plurality of inlay portions 110 which extend beyond the outer shell 105 may be beveled, pointed, rounded, tapered, and/or otherwise shaped in order to reduce the thickness of the portion 125 toward the striking edge 135 used to interact with a stringed instrument's strings (e.g., guitar strings and/or other suitable stringed instrument strings).

According to various embodiments, the material of the outer shell 105 may be different from the material of one or more of the plurality of inlay portions 110. Additionally, the material of the outer shell 105 may be configured produce a first tonal quality when placed in contact with the stringed instrument strings, the material of one or more of the plurality of inlay portions 110 may be configured to produce one or more second tonal qualities when placed in contact with the stringed instrument strings, and the first tonal quality may be different from the one or more second tonal qualities. The first tonal qualities and the second tonal qualities each may be configured to contribute unique tonal characteristics of the plectrum 100 and its effect on the strings via the physical characteristics of its materials. According to various embodiments, each of the plurality of inlay portions 110 may comprise a same material. According to various embodiments, one or more of the plurality of inlay portions 110 may comprise one or more materials different from one or more other inlay portions in the plurality of inlay portions 110.

According to various embodiments, variations in the materials used in the manufacture of the outer shell 105 and/or one or more of the plurality of inlay portions 110, and variations in the manner of manufacturing, combining, securing, and/or adhering the materials of the outer shell 105 and/or one or more of the plurality of inlay portions 110 may have a direct effect on the first tonal qualities, the second tonal qualities, and the overall resonation quality of the sound created through the mechanical interaction between the plectrum 100 and the strings in the action of striking, picking, or rubbing the strings. For example, the specific metals that are used to create the striking edge 135 may have varied tonal and resonance attributes depending upon the material type or types used in the construction of one or more of the plurality of inlay portions 110.

In addition to the materials used for the outer shell 105 and one or more of the plurality of inlay portions 110, the means of how one or more of the plurality of inlay portions 110 is fixed (e.g., mechanically, chemically, etc.) within the outer shell may contribute to the manner of use, tone, and feel of the plectrum 100 as a whole. For example, whether an inlay portion 110, of the plurality of inlay portions 110, is molded into, secured by pins, adhered by chemical bonding agents, and/or secured by other suitable means within the outer shell 105 effects the tonal qualities of the plectrum 100. The outer shell 105 may have the effect of dampening the metallic sound or "twang" of the metal striking edge 135 of the inlay portion 110 to degrees based upon the means in which an inlay portion 110, of the plurality of inlay portions 110, is fixed within the outer shell 105. If an inlay portion 110, of the plurality of inlay portions 110, is fixed to the outer shell 105 using an adhesive means, the material used to adhere the inlay portion 110 to the outer shell 105 may be varied based upon user preferences of thickness, width, and weight for the overall plectrum 100.

According to various embodiments, the material(s), shape(s), and/or dimensions of the outer shell 105 and/or the material(s), shape(s), and/or dimensions of the inlay portion 110 may be altered in order to alter the first tonal quality and/or the second tonal quality, and/or to increase or decrease the strength of the physical assembly of the plectrum 100. Alterations may comprise, but are not limited to, increasing and/or decreasing thickness, drilling, abrading the striking edge 135, irregularly shaping the striking edge 135, and/or other suitable alterations.

According to various embodiments, the outer shell 105 may form a rigid body, and the surface of the plectrum 100 may be shaped such that the surface of the outer shell 105 is flush with the surface of the portion 125 of one or more (e.g., some or all) of the plurality of inlay portions 110 that extends past the outer shell 105 at the transition between the outer shell 105 and the one or more of the plurality of inlay portions 110, enabling a smooth transition for the stringed instrument strings when rubbing over the plectrum 100, enabling the plectrum 100 to produce, on the guitar, the first tonal quality and the second tonal quality.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A plectrum for use with a stringed musical instrument, comprising:

a rigid outer shell; and a plurality of inlay portions, wherein:

each inlay portion, of the plurality of inlay portions:

is partially inserted within, and secured to, the outer shell; and comprises a portion that extends beyond the outer shell;

the outer shell comprises a first material configured to produce first tonal properties in a string of a stringed musical instrument when placed in contact with the string, the plurality of inlay portions comprise a second material configured to produce second tonal properties in the string when placed in contact with the string, and the first tonal properties are different from the second tonal properties.

2. The plectrum as recited in claim 1, wherein the first material is different from the second material.

3. The plectrum as recited in claim 1, wherein the second material comprises metal.

4. The plectrum as recited in claim 1, wherein the first material comprises one or more of the following: plastic; metal; wood; rubber; glass; and stone.

5. The plectrum as recited in claim 1, wherein, for each of one or more inlay portions of the plurality of inlay portions, the outer shell and the inlay portion are shaped such that a surface of the outer shell is flush with a surface of the inlay portion at a transition between the outer shell and the inlay portion.

6. The plectrum as recited in claim 5, wherein the one or more inlay portions of the plurality of inlay portions comprises all the plurality of inlay portions.

7. The plectrum as recited in claim 1, wherein:

the outer shell comprises a front half portion and a rear half portion, and the front half portion and the rear half portion are secured to each other.

8. The plectrum as recited in claim 1, wherein one or more of the plurality of inlay portions are secured within the outer shell using a chemical bonding agent.

9. The plectrum as recited in claim 1, wherein each inlay portion of the plurality of inlay portions tapers toward a striking edge.

10. The plectrum as recited in claim 1, wherein one or more of the plurality of inlay portions comprise a plurality of holes configured to facilitate mechanical means of securing the inlay portion to the outer shell.

11. The plectrum as recited in claim 1, wherein one or more inlay portions of the plurality of inlay portions has a generally chevron-type shape.

12. The plectrum as recited in claim 1, wherein the outer shell comprises an opening configured to receive a portion of the inlay portion.

13. The plectrum as recited in claim 1, wherein one or more inlay portions of the plurality of inlay portions comprise a textured surface for facilitating bonding between the outer shell and the inlay portion.

14. The plectrum as recited in claim 1, wherein the plurality of inlay portions comprises an inlay portion comprising one or more inverted scallops.

15. A plectrum for use with a stringed musical instrument, comprising:

a rigid outer shell; and an inlay portion;

wherein:

the inlay portion:

is partially inserted within, and secured to, the outer shell;

comprises a portion that extends beyond the outer shell; and comprises one or more inverted scallops, the outer shell comprises a first material configured to produce first tonal properties in a string of a stringed musical instrument when placed in contact with the string, the inlay portion comprises a second material configured to produce second tonal properties in the string when placed in contact with the string, and the first tonal properties are different from the second tonal properties.

16. The plectrum as recited in claim 15, wherein the outer shell and the inlay portion are shaped such that a surface of the outer shell is flush with a surface of the inlay portion at a transition between the outer shell and the inlay portion.

17. The plectrum as recited in claim 15, further comprising one or more second inlay portions, wherein one or more of the one or more second inlay portions:

is partially inserted within, and secured to, the outer shell; and comprises a portion that extends beyond the outer shell.

18. The plectrum as recited in claim 17, wherein, for each second inlay portion of the one or more second inlay portions, the outer shell and the second inlay portion are shaped such that a surface of the outer shell is flush with a surface of the second inlay portion at a transition between the outer shell and the second inlay portion.

19. The plectrum as recited in claim 15, wherein the outer shell comprises an opening configured to receive a portion of the inlay portion.

20. The plectrum as recited in claim 15, wherein:

the outer shell comprises a front half portion and a rear half portion, and the front half portion and the rear half portion are secured to each other.

* * * * *